(12) United States Patent
Hwang

(10) Patent No.: US 7,217,912 B2
(45) Date of Patent: May 15, 2007

(54) DIRECTION-TURNING DEVICE FOR THE LENS OF A CAMERA PHONE

(76) Inventor: Jin-Chyuan Hwang, No. 6, Lane 31, Tai Zih 4th Road, Ren De, Tainan County (TW) 717

(*) Notice: Subject to any disclaimer, the term of this patent is extended or adjusted under 35 U.S.C. 154(b) by 0 days.

(21) Appl. No.: 11/389,116

(22) Filed: Mar. 27, 2006

(65) Prior Publication Data

US 2006/0261257 A1    Nov. 23, 2006

(30) Foreign Application Priority Data

May 17, 2005    (TW) .............................. 94115871 A

(51) Int. Cl.
H01L 27/00 (2006.01)
H04M 1/00 (2006.01)
H04B 1/38 (2006.01)
G03B 1/00 (2006.01)

(52) U.S. Cl. ............... 250/208.1; 250/216; 348/376; 455/575.3; 379/433.13

(58) Field of Classification Search ............. 250/208.1, 250/216, 239; 348/373, 376; 455/575.1, 455/575.3, 90.3; 379/433.01, 433.05, 433.13
See application file for complete search history.

(56) References Cited

U.S. PATENT DOCUMENTS 7,146,200 B2 *   12/2006   Park et al. ............... 455/575.3
2006/0261248 A1*   11/2006   Hwang .................... 250/208.1

* cited by examiner

Primary Examiner—Kevin Pyo
(74) Attorney, Agent, or Firm—Bacon & Thomas, PLLC

(57) ABSTRACT

A direction-turning device for the lens of a camera phone contained in the rear side of the camera phone includes a lens base having a pivot at two sides respectively connected pivotally in an interior wall of the groove, a driving unit able to rotate the pivot for 180 degrees, and a positioning unit having an auxiliary gear fixed with the lens base and an elastic locking wire always stopping the auxiliary gear to keep the lens base positioned stably when moved to a position electronically or manually. The driving unit and the pivot of the lens base are linked by viscous oil, enabling the lens base driven by the driving unit or manually. The invention is totally hidden to keep the camera phone looked normally and able to shift the lens to face forward or backward with a self-shooting function.

7 Claims, 11 Drawing Sheets

DIRECTION-TURNING DEVICE FOR THE LENS OF A CAMERA PHONE

BACKGROUND OF THE INVENTION

1. Field of the Invention

This invention relates to a direction-turning device for the lens of a camera phone, particularly to one that is hidden in the rear side of the camera phone under normal condition and able to change its direction for a self-shooting.

2. Description of the Prior Art

As shown in FIGS. 1 and 2, a first non-foldable conventional camera phone is provided with a lens 10 fixed immovably in the rear side, so that the lens is to aim forward while a user holds the camera phone and views images seen through the lens on a screen 11 in the front side of the phone, convenient for a user to take a picture. But, if a user wants to take a self-shooting picture, he has to stand in front of a mirror and keep the lens aimed at the portrait in the mirror for shooting, really inconvenient for self-shooting.

Next, as shown in FIGS. 3 and 4, a second non-foldable camera phone is provided with a gap 12 in the top for fitting with a lens base 13, which is provided with a shaft 130 at its two ends respectively for connecting pivotally with an interior wall of the gap 12 so that the lens base 13 can be turned around to enable the lens 10 to face forward for normal shooting or backward for self-shooting. But, the gap 12 extended out of the front top of the phone is aesthetically downgraded tremendously.

This invention has been revised to overcome the defects mentioned above.

SUMMARY OF THE INVENTION

The objective of this invention is to offer a direction-diverting device for the lens of a camera phone.

The main characteristics of the invention contained in a groove cut in an edge at the rear side of the camera phone are a lens base, a positioning unit, a driving unit and a restricting unit. The lens base fitted in the groove is provided with a pivot at two sides respectively connected pivotally in an interior wall of the groove. The driving unit is able to activate the pivot to rotate for 180 degrees. And, because the driving unit and the pivot of the lens base are linked only by viscous oil, so the lens base can also be moved manually with a force. The positioning unit is provided with an auxiliary gear fixed with one side of the lens base and an elastic locking wire always matched with the auxiliary gear so as to keep the lens base positioned stably when moved to a preset position electronically or manually. Therefore, the invention is totally hidden in the groove to keep the camera phone looked wholly while viewing from the front of the phone and can be shifted to enable the lens to face forward or backward, providing a self-shooting function.

BRIEF DESCRIPTION OF DRAWINGS

This invention is better understood by referring to the accompanying drawings, wherein.

DETAILED DESCRIPTION OF THE PREFERRED EMBODIMENT

Figure 2:
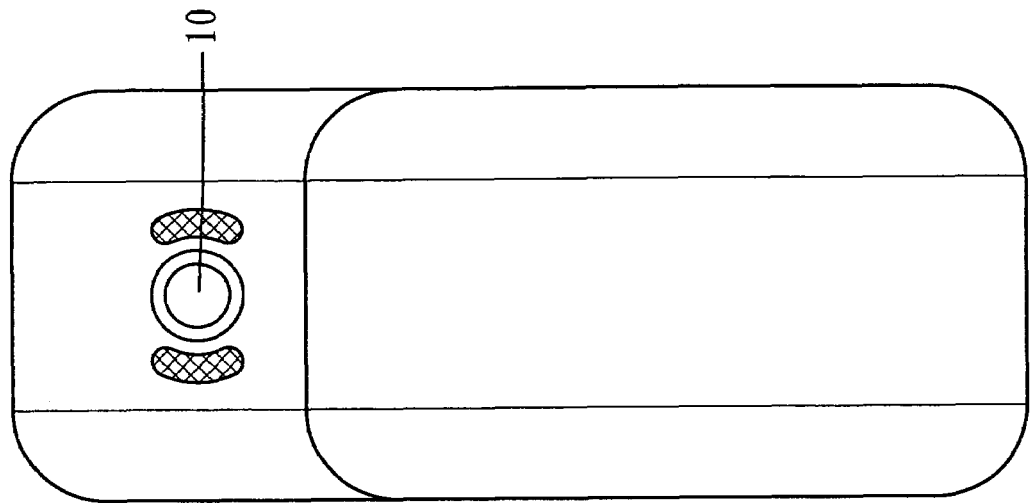
FIG. 2 is a rear view of the first conventional non-foldable camera phone.
Figure 1:
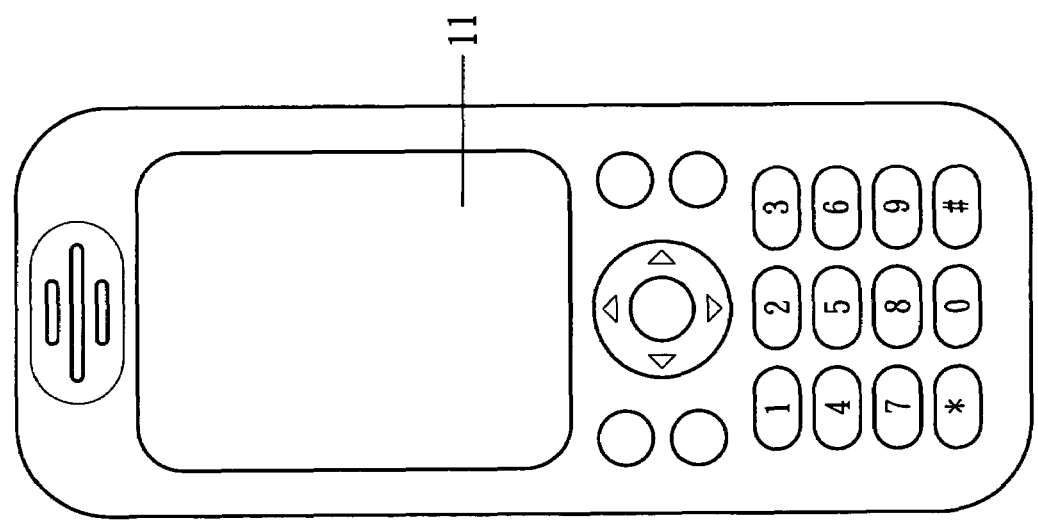
FIG. 1 is a front view of a first conventional non-foldable camera phone.
Figure 3:
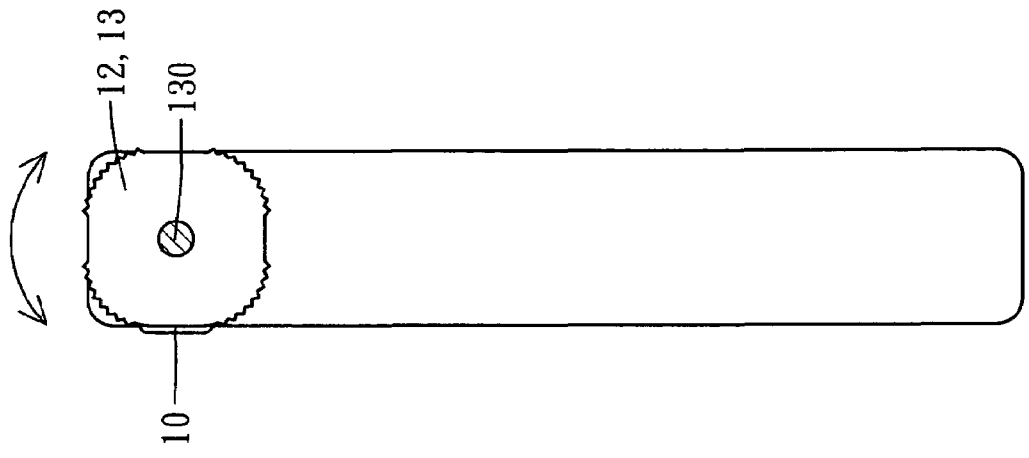
FIG. 3 is a front view of a second conventional non-foldable camera phone.
Figure 4:
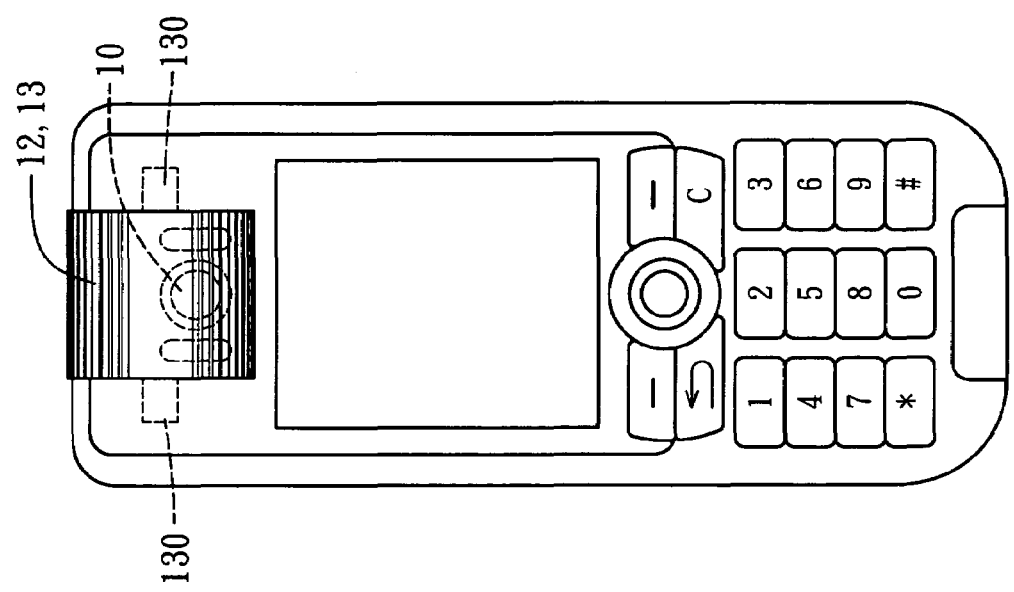
FIG. 4 is a side view of the second conventional non-foldable camera phone.
Figure 5:
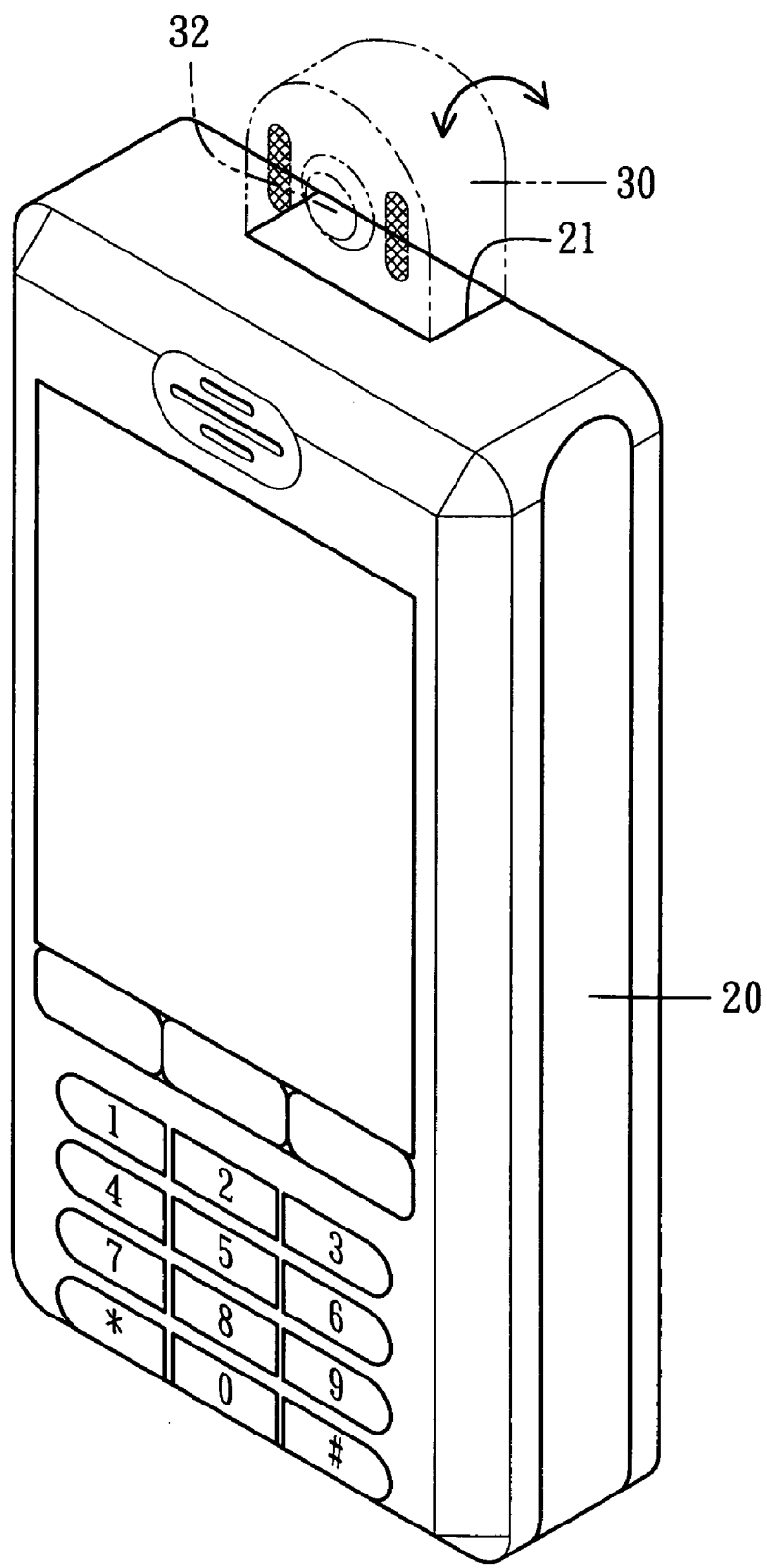
FIG. 5 is a perspective view of a first preferred embodiment of a direction-turning device for the lens of a camera phone in the present invention.
Figure 6:
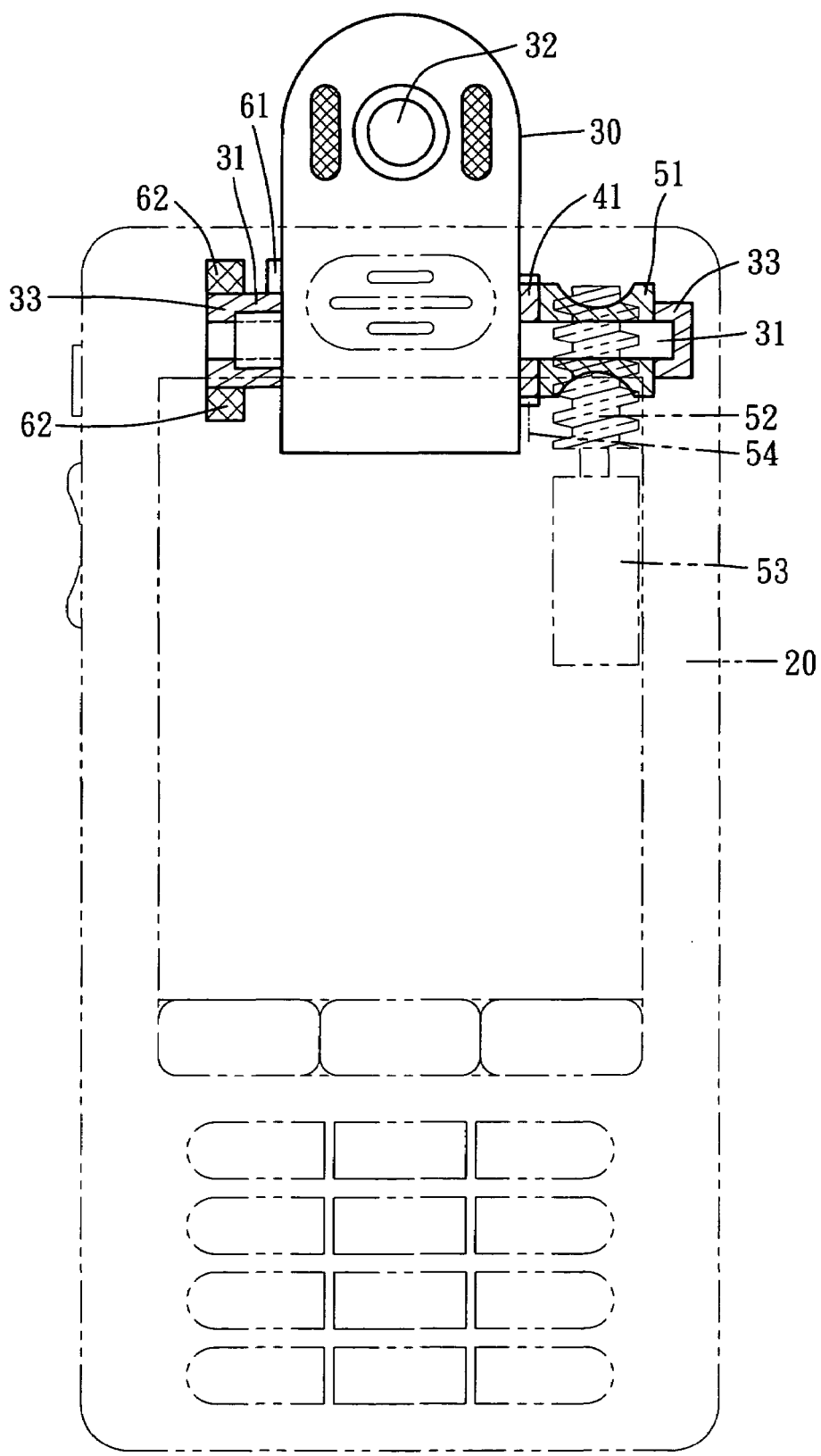
FIG. 6 is a front perspective view of the first preferred embodiment of a direction-turning device for the lens of a camera phone in the present invention.
Figure 7:
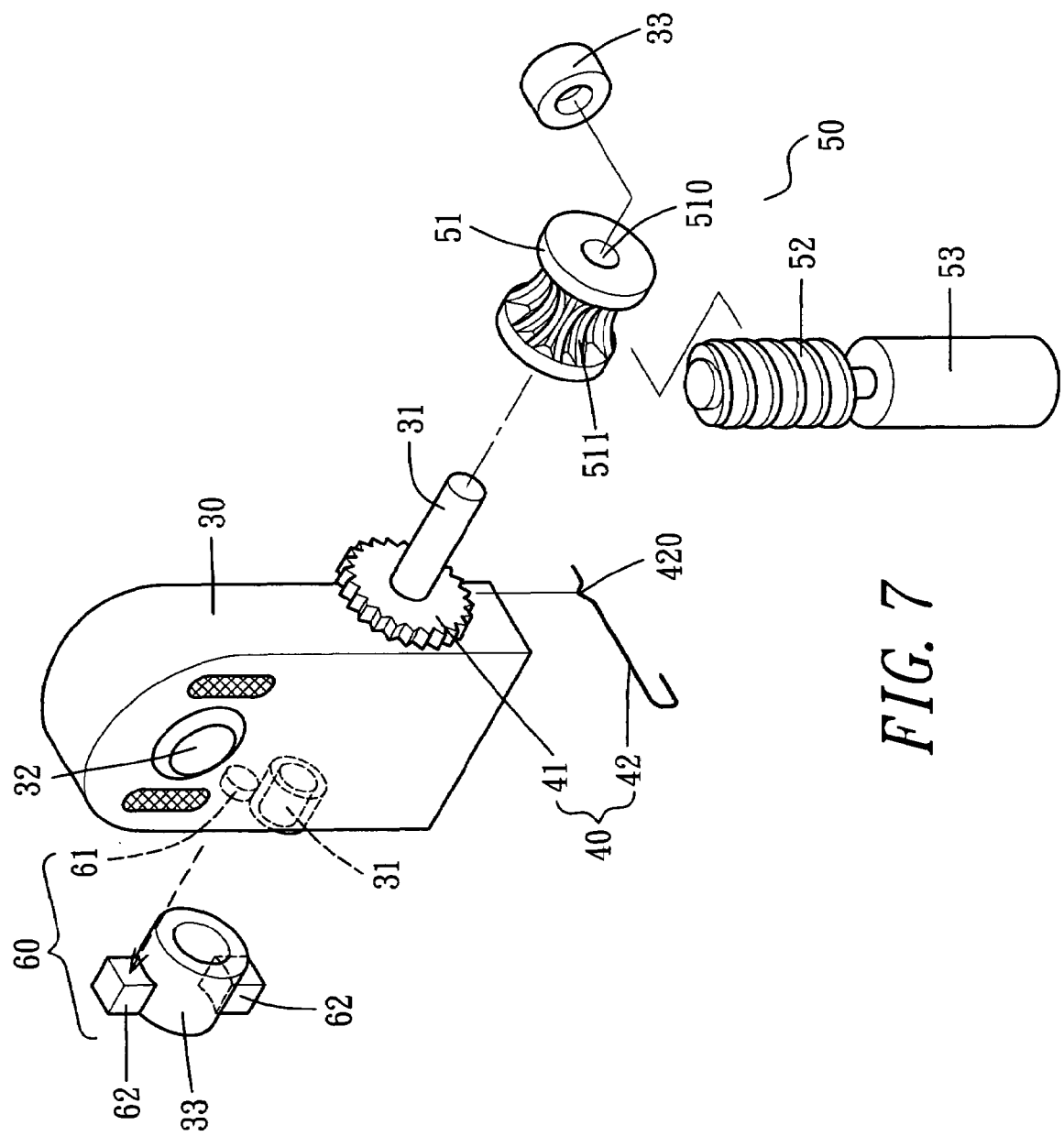
FIG. 7 is a partial exploded perspective view of the first preferred embodiment of a direction-turning device for the lens of a camera phone in the present invention.
Figure 8:
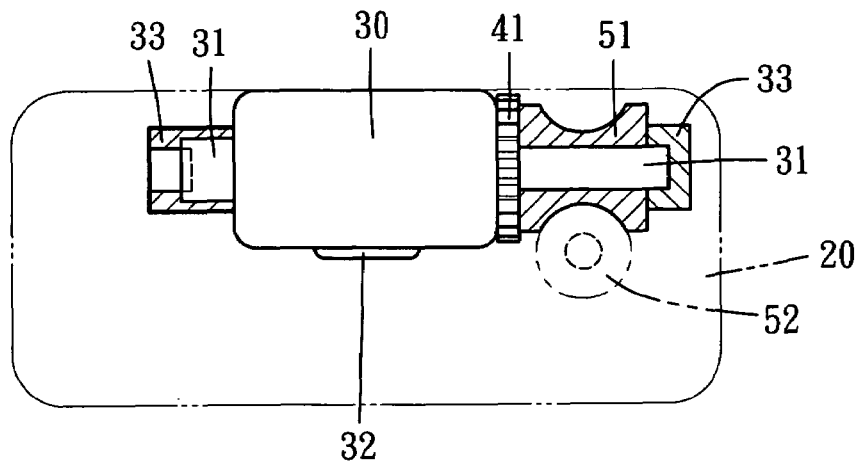
FIG. 8 is an upper view of the first preferred embodiment of a direction-turning device for the lens of a camera phone in the present invention.

As shown in FIGS. 5, 6 and 7, a first preferred embodiment of a direction-turning device for the lens of a camera phone 20 in the present invention includes a lens base 30, a positioning unit 40, a driving unit 50 and a restricting unit 60. The camera phone 20 is provided with a groove 21 cut in the central top portion of the rear side.

The lens base 30 having exactly the same shape and size as the groove 21 for being fitted in the groove 21 is provided with a pivot 31 extended outwards eccentrically at two sides respectively and fitted in a pivot hole in the interior wall of the groove 21, a lens 32 located in the rear side and two supporting members 33 respectively used to support one end of each pivot 31.

Figure 9:
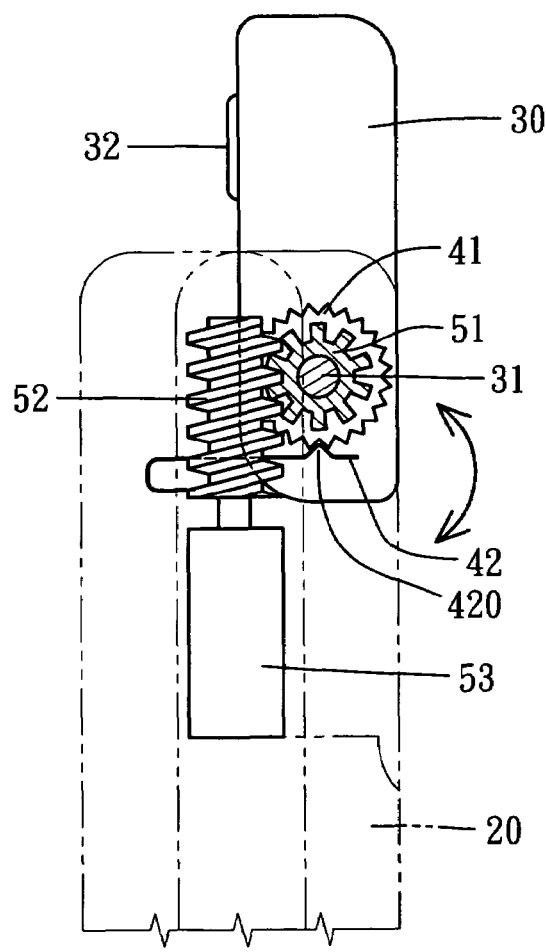
FIG. 9 is a side view of the first preferred embodiment of a direction-turning device for the lens of a camera phone in the present invention.

The positioning unit 40 is provided with an auxiliary gear 41 fixed together with a sidewall of the lens base 30 (or able to be formed together integral) and an elastic locking wire 42 (able to be formed by bending a steel wire) provided with a conical hump 420 that is protruded toward the auxiliary gear 41 to fit in a gap between two teeth of the auxiliary gear 41, as shown in FIGS. 7 and 9.

The driving unit 50, as shown in FIGS. 6 and 7, able to be controlled by a button on the phone is provided with a worm gear 51 having a hole 510 at the center for one of the pivots 31 of the lens base 30 to insert and worm teeth 511 for engaging with a worm 52 driven by a motor 53 to rotate. Then, viscous oil is filled in between the pivot 31 and the hole 510.

The restricting unit 60, as shown in FIG. 6, used to control the displacement of the lens base 30 is provided with a first sensor 61 fixed at one side of the lens base 30 and two second sensors 62 set on the outer edge of the supporting member 33 spaced apart oppositely, as shown in FIGS. 6 and 7, and able to be moved to align with the first sensor 61 for stopping the motor 53 of the driving unit 50 from rotating. And, if the restricting unit 60 is not controlled electronically, it can be replaced with a blocking device to do the job.

In using, as shown in FIG. 6, the operating procedures are described as below.

Figure 10:
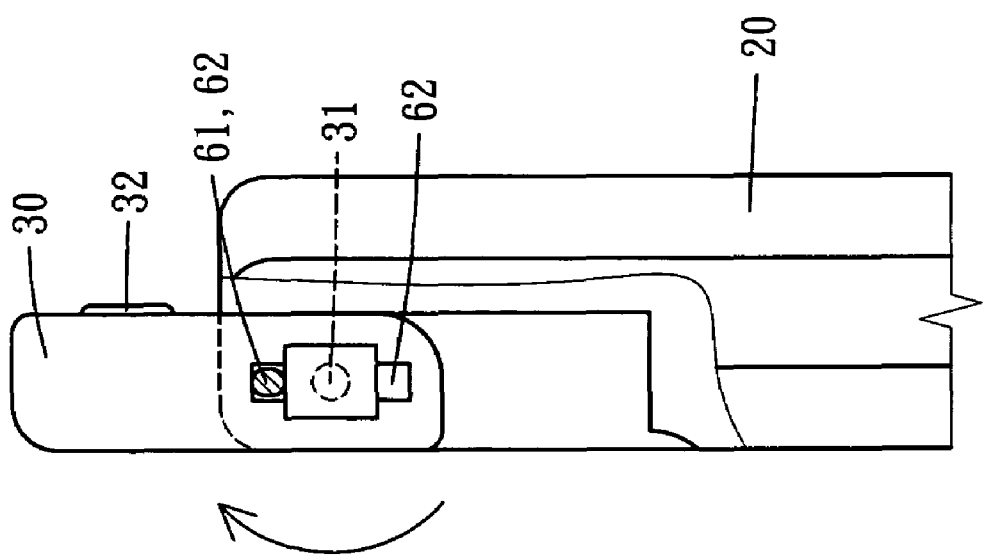
FIG. 10 is a side view of the first preferred embodiment of a direction-turning device for the lens of a camera phone in, the present invention, showing its lens base having been moved to stand vertically out of a groove.

1. For a self-shooting usage: Press the controlling button to start activating the motor 53 of the driving unit 50 to enable the worm 52 and the worm gear 51 to rotate successively. Because of the viscous oil filled between the hole 510 of the worm gear 51 and the pivot 31 of the lens base 30, the pivot 31 is to be moved to spin when the worm gear 51 is driven to reach a certain speed, so is the lens base 30 to be turned upwards for 180 degrees by means of the pivot 31 of the lens base 30, until the lens base 30 stands vertically, as shown in FIGS. 9 and 10. By the time, the first sensor 61 and one of the second sensors 62 are aligned to cease the motor 53, enabling the lens 32 in the lens base 30 to face toward the front side of the phone instead of the rear side originally, as shown in FIGS. 6, 9 and 10, ready for a user to shoot himself (herself). In addition, because the worm gear 51 and the lens base 30 are linked only by viscous ;oil, not immovable, the lens base 30 can also be moved manually as long as a user exerts force surpassing a sticky resistance caused by the viscous oil. Moreover, since the auxiliary gear 41 is always locked by the conical hump 420 of the elastic locking wire 42, the lens base 30 is any time positioned stably whenever it stands quietly or is being moved.

Figure 11:
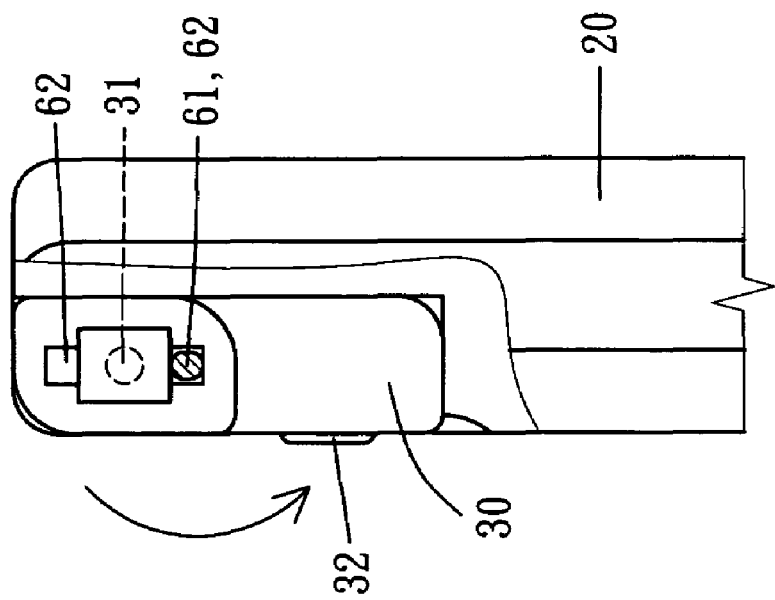
FIG. 11 is a side view of the first preferred embodiment of a direction-turning device for the lens of a camera phone in the present invention, showing its lens base moved down to stay in the groove.

2. For a normal usage: First, press the controlling button to start activating the driving unit 50 to turn the lens base 30 back in the groove 21 or do it manually, as shown in FIG. 11. By the time, the lens 32 is facing in a direction as the rear side of the camera phone 20 is, ready for normal shooting.

Figure 12:
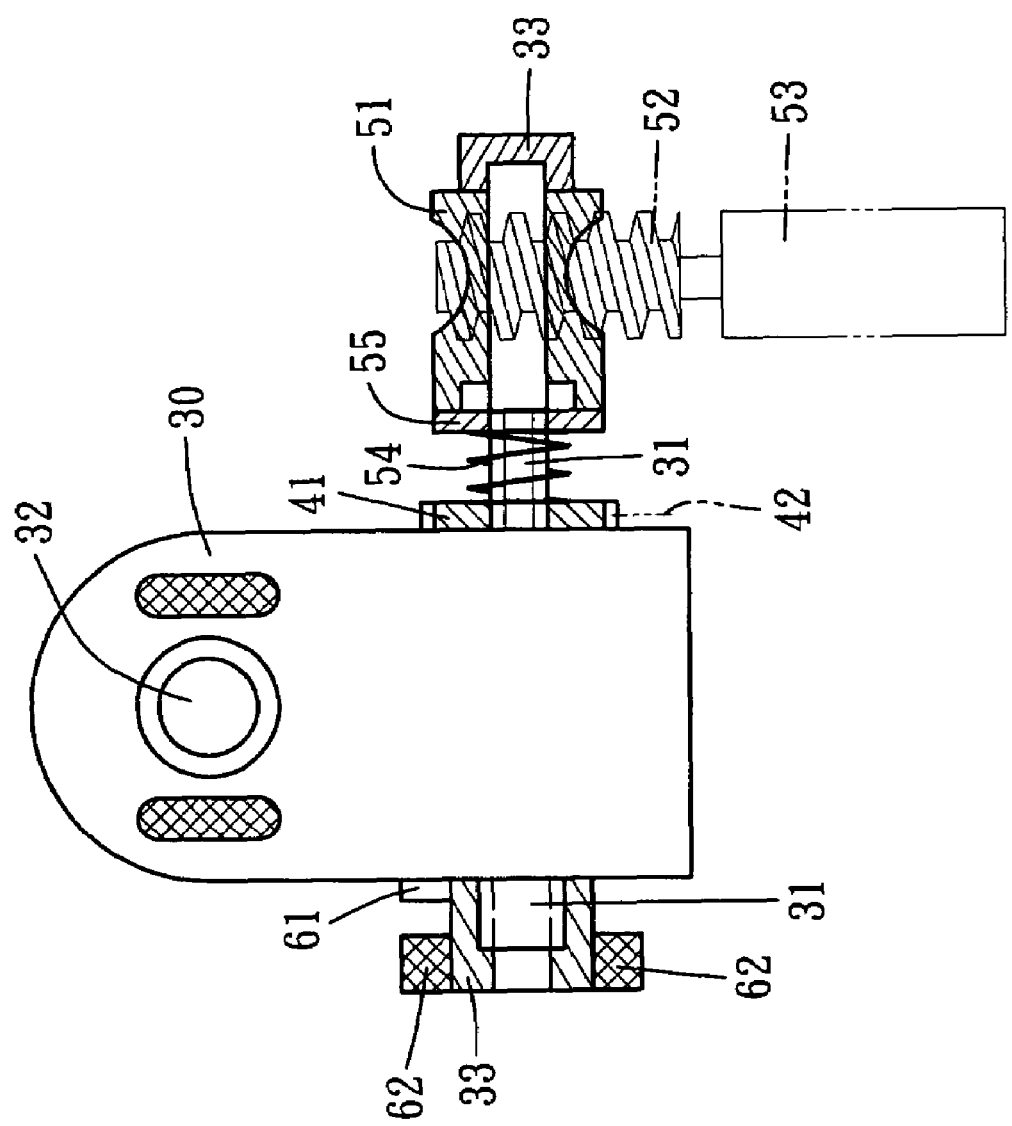
FIG. 12 is a side view of a driving unit of a second preferred embodiment of a direction-turning device for the lens of a camera phone in the present invention.
Figure 13:
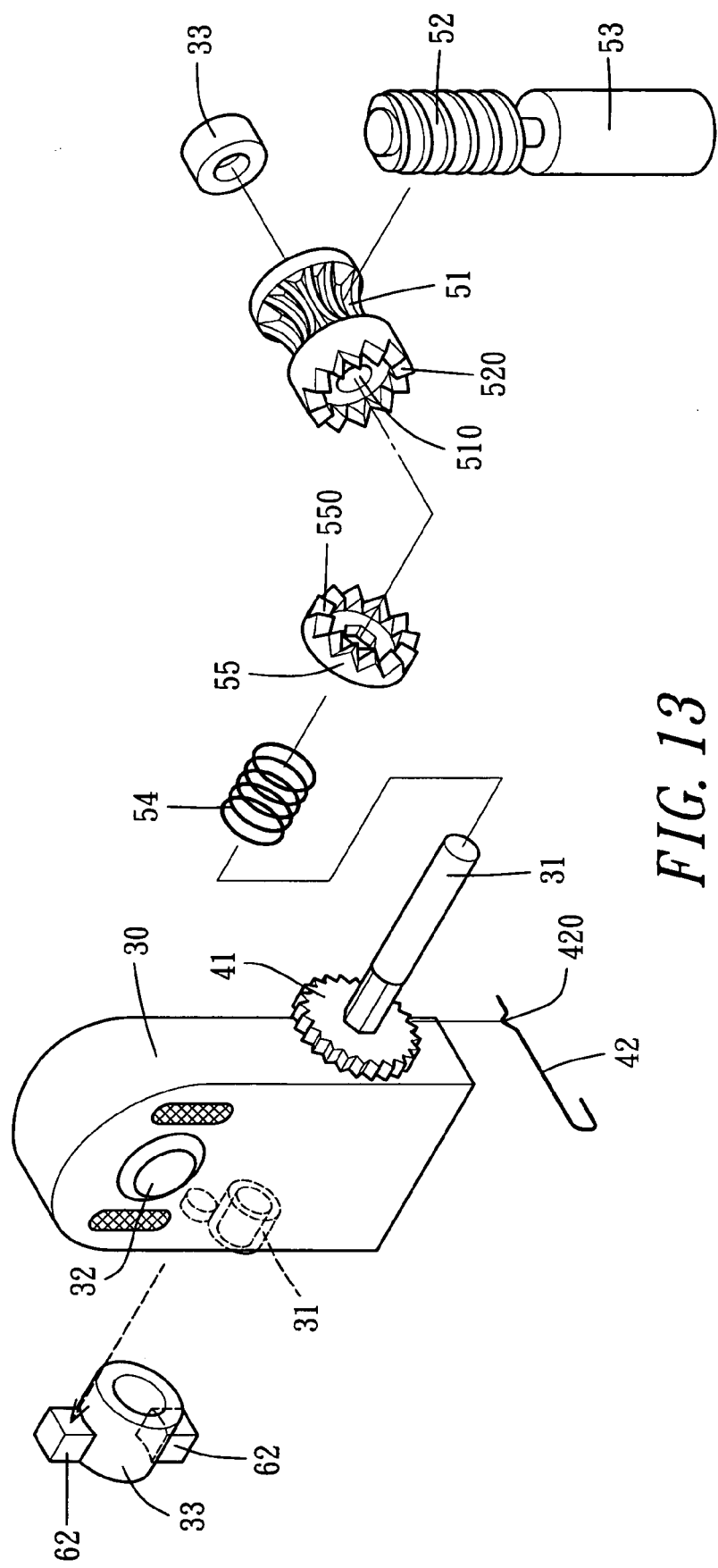
FIG. 13 is an exploded perspective view of the driving unit of the second preferred embodiment of a direction-turning device for the lens of a camera phones in the present invention.

Next, as shown in FIGS. 12 and 13, a second preferred embodiment of a direction-turning device for the lens of a camera phone in the present invention has mostly the same components as the first embodiment does. The different parts are described below. The part of the pivot 31 fitting tightly in the hole 510 of the worm gear 51 is shaped rounded and that between the worm gear 51 and the auxiliary gear 41 is shaped polygonal, such as hexagonal. And, a coiled spring 54 and a geared disc 55 to be matched with the worm gear 51 are engaged with the polygonal part of the pivot 31 and located between the auxiliary gear 41 and the worm gear 51. The geared disc 55 is provided with gear teeth 550 for engaging with gear teeth 520 formed on one side of the worm gear 51, as shown in FIG. 13. In case that the viscous oil filled between the pivot 31 and the worm gear 51 becomes degraded after a period of time, the coiled spring 54 can still expand to squeeze the gear dish 55 to closely match with the worm gear 51 so that the geared disc 55 is able to be driven to activate the pivot 31 to rotate and the lens base 30 is of course to be moved without difficulty. And, similar to the first embodiment, the lens base 30 is any time positioned stably regardless of standing immoably or being moved, since the auxiliary gear 41 is always locked by the conical hump 420 of the elastic locking wire 42.

Figure 14:
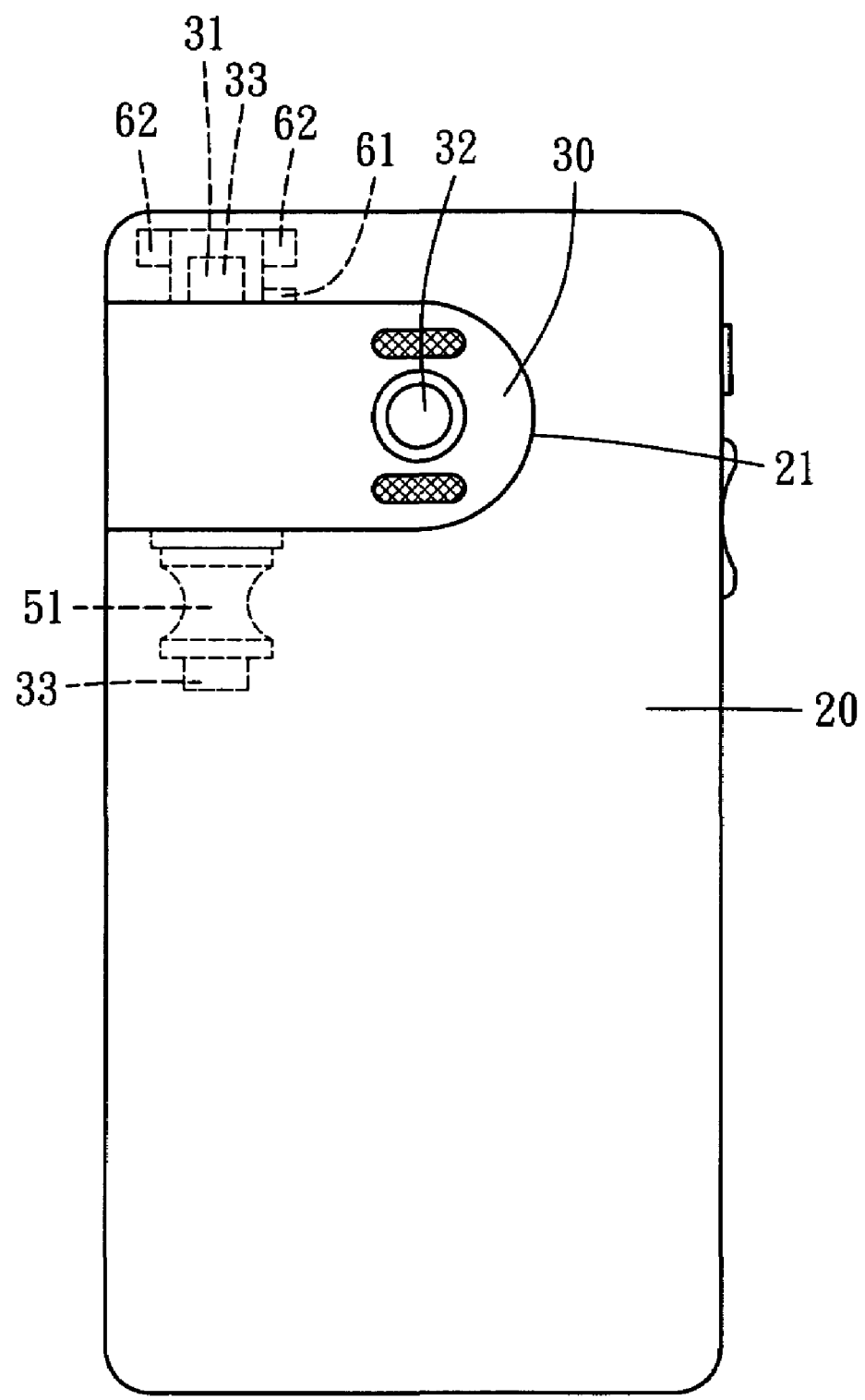
FIG. 14 is a rear view of a third preferred embodiment of a direction-diverting device for the lens of a camera phone in the present invention.
Figure 15:
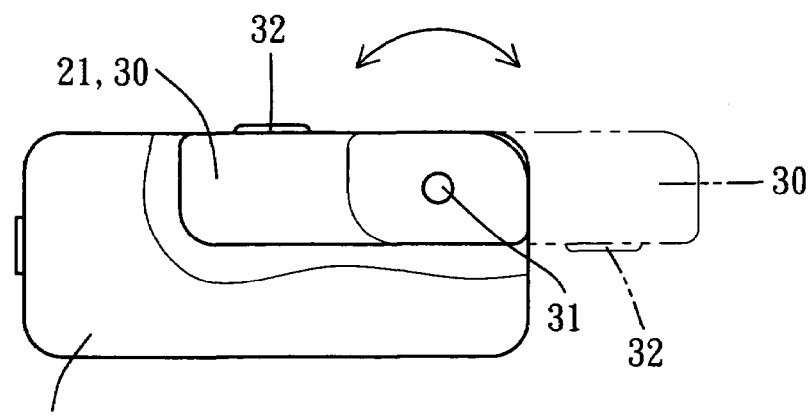
FIG. 15 is an upper view of the third preferred embodiment of a direction-turning device for the lens of a camera phone in the present invention.
Figure 16:
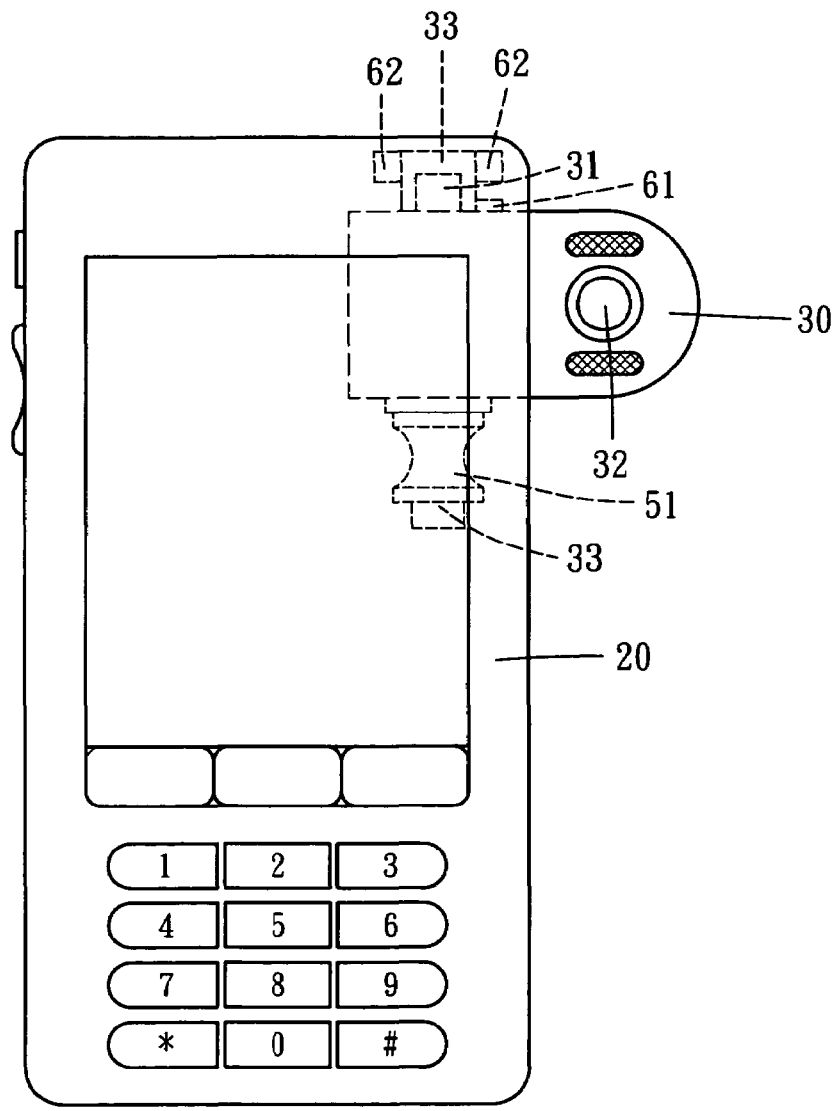
FIG. 16 is a front view of the third preferred embodiment of a direction-turning device for the lens of a camera phone in the present invention.

In addition, as shown in FIGS. 14–16, the groove 21 for containing the lens base 30 can also be cut on one side of the camera phone 20.

The invention has the following advantages as can be seen from the foresaid description.

1. The lens base 30 carrying the lens 32 is hidden in the rear portion of the camera phone 20, keeping the front side of the camera phone 20 unaffected wholly and aesthetically.

2. The lens 32 (the lens base 30) can be controlled electronically or manually to change its direction.

3. The lens 32 (the lens base 30) can be positioned stably by the positioning member 40 while it is being moved to change direction.

While the preferred embodiment of the invention has been described above, it will be recognized and understood that various modifications may be made therein and the appended claims are intended to cover all such modifications that may fall within the spirit and scope of the invention.

What is claimed is:

1. A direction-turning device for the lens of a camera phone comprising:

a lens base contained in a groove formed in a central top portion of a rear side of said camera phone and provided with a pivot extended outwards eccentrically at the upper portion of its two sides respectively and fitted pivotally in an interior wall of said groove so that said lens base can be turn up or down through the opening of the said groove, and a lens located in the lower portion facing outward from the rear side of said camera phone; and a driving unit used to activate said pivot of said lens base to rotate to enable said lens base to move to change its direction;

a restricting unit used to determine when to cease said driving member so as to keep said lens base standing out of said groove vertically and said lens facing toward the front side of said camera phone.

2. A direction-diverting device for the lens of a camera phone as claimed in claim 1, wherein said driving unit includes a motor, a worm driven by said motor, a worm gear having a hole coated with a viscous oil for engaging with one end of one of said pivots and engaging with said worm so as to indirectly drive said pivot to rotate, enabling said lens base to turn upside down for changing its direction.

3. A direction-turning device for the lens of a camera phone as claimed in claim 1, wherein a positioning unit additionally added is provided with an auxiliary gear fixed together with said lens base, an elastic locking wire provided with a conical hump protruded toward said auxiliary gear for fitting in a gap between two teeth of said auxiliary gear to enable said auxiliary gear to be stopped with said conical hump any time, keeping said lens base positioned stably.

4. A direction-turning device for the lens of a camera phone as claimed in, claim 1, wherein said restricting unit is provided with a first sensor fixed at one side of said lens base and two second sensors set at two preset portions of said lens base able to be aligned with said first sensor while said lens base stays originally or is turned for 180 degrees, for stopping said driving unit from moving.

5. A direction-turning device for the lens of a camera phone as claimed in claim 2, wherein a geared disc provided with gear teeth on one side and mounted also on said pivot is squeezed by a coiled spring to keep said gear teeth engaging closely with gear teeth formed on the inner side of said worm gear.

6. A direction-diverting device for the lens of a camera phone as claimed in claim 1, wherein said groove is communicated to a top edge of said camera phone.

7. A direction-diverting device for the lens of a camera phone as claimed in claim 1, wherein said groove is emptied through a side edge of said camera phone.

* * * * *